United States Patent Office 3,408,420
Patented Oct. 29, 1968

3,408,420
SILANE-MODIFIED OLEFINIC COPOLYMERS
John Bentley Wiggill, Wilmington, Del., assignor to E. I. du Pont de Nemours and Company, Wilmington, Del., a corporation of Delaware
No Drawing. Continuation-in-part of application Ser. No. 363,973, Apr. 30, 1964. This application Mar. 19, 1965, Ser. No. 441,357
3 Claims. (Cl. 260—827)

ABSTRACT OF THE DISCLOSURE

Olefinic copolymers containing at least 50 mol percent alpha olefin units, acid halide units, and at least 0.1 mol percent pendant silane groups, said silane groups containing at least one readily hydrolyzable group, and process of preparing said copolymers by reactions such as reaction of an ethylene/acryl chloride polymer with an aminosilane.

---

This application is a continuation-in-part of United States patent application Ser. No. 363,973, filed Apr. 30, 1964, and now abandoned. This invention relates to silane-modified alpha-olefin containing copolymers.

It is known in the art to produce copolymers of alpha-olefin and alpha-beta-ethylenically unsaturated carboxylic acids, such as ethylene-methacrylic acid copolymers, and it is also known to produce copolymers of alpha-olefin and vinyl esters such as ethylene-vinyl acetate copolymers. It is further known in the art to modify these copolymers by reaction of the carboxylic acid groups or the vinyl ester groups; for example, ethylene-methacrylyl halide copolymers have been produced by reacting an ethylene-methacrylic acid copolymer with a halogenating compound, and ethylene-vinyl alcohol copolymers have been produced by hydrolysis of the vinyl acetate containing copolymers. The present invention is concerned with modification of these copolymers by reacting the copolymer with a silane compound, as hereinafter defined.

Suitable copolymers for use as starting materials for the production of the copolymers of this invention comprise at least one alpha-olefin unit having the general formula

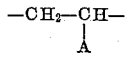

where A is a radical selected from the class consisting of hydrogen and hydrocarbon radicals having one to eight carbon atoms and at least one alpha-beta-ethylenically unsaturated carboxylic acid unit having one to two carboxylic acid unit having one to two carboxylic acid groups. Preferably, the alpha-beta-ethylenically unsaturated carboxylic acid unit has 3 to 8 carbon atoms. The concentration of the alpha-olefin unit in the copolymer is at least 50 mol percent and preferably greater than 80 mol percent. The concentration of the alpha-beta-ethylenically unsaturated carboxylic acid unit in the copolymer is 0.2 mol percent to 25 mol percent, preferably from 1 to 10 percent. Specific alpha-olefin units useful in the copolymers include: ethylene, propylene, butene-1, styrene, pentene-1, hexene-1, heptene-1, 3 methylbutene-1, and 4 methyl-pentene-1. Specific alpha-beta-ethylenically unsaturated carboxylic acid units useful in the copolymers include: acrylic, methacrylic, ethacrylic, itaconic, maleic, fumaric, monoesters of dicarboxylic acid such as ethyl hydrogen fumarate, and maleic anhydride. Maleic anhydride and other mono-alpha-beta-ethylenically unsaturated anhydrides are considered acids for the purposes of the present invention. Specific vinyl esters include: vinyl acetate, vinyl formate, vinyl propionate, vinyl n-butyrate, vinyl chloroacetate, vinyl diethylacetate, vinyl isobutyrate, vinyl isocaproate, vinyl benzoate, vinyl-2,4-dimethyl- pentanoate, vinyl laurate, vinyl trimethyl-acetate, vinyl tertiarybutyl acetate and vinyl thiolacetate.

The preferred process for preparing the acid copolymers for use in the process of the present invention is direct copolymerization. This may be achieved by introducing the monomers into a polymerization environment maintained at high pressures, 50 to 3000 atmospheres, and at elevated temperature, 150° C. to 300° C., together with a free radical polymerization catalyst. An inert solvent such as water or benzene may be employed in the polymerization environment. Random distribution of carboxylic acid groups in all the polymer molecules is best obtained by direct copolymerization. Particular processes for the production of the copolymers are known in the art and described in the literature.

The copolymers may also be obtained by grafting an alpha-beta-ethylenically unsaturated carboxylic acid to a polyolefin base, or by conversion of a copolymer of a polyolefin and a derivative of carboxylic acid to the free acid.

The copolymers are preferably of high molecular weight. Molecular weight is suitably defined by melt index, a measure of viscosity described in detail in ASTM–D–1238–57T. The melt index of the copolymers preferred in the present invention is within the range of 0.1 to 1000 g./10 min.

A suitable process for the production of the vinyl ester copolymers is described in British Patent 582,093.

The acid copolymer need not be a two component polymer. Thus, although the olefin content of the copolymer should be at least 50 mol percent, more than one olefin can be employed to provide the hydrocarbon nature of the copolymer, also more than one alpha-beta-ethylenically unsaturated carboxylic acid may be employed. Additionally, any third copolymerizable monomer can be employed in combination with the olefin and the carboxylic acid comonomer. Preferred termonomers are vinyl esters and acrylates, i.e., alkyl acrylates and methacrylates having up to eight carbon atoms, vinyl acetate, vinyl propionate, methyl methacrylate and ethyl acrylate. These termonomers are preferably present to the extent of 0.1 to 25 mol percent based on the total mols polymerized. The scope of acid copolymers suitable for use in the present invention is illustrated by the following examples: Ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate copolymers, ethylene/methacrylic acid/methyl methacrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, ethylene/chlorotrifluoroethylene/methacrylic acid copolymers, ethylene/methacrylic acid/acrylic acid copolymers, and ethylene/methacrylic acid/maleic anhydride copolymers.

The copolymer containing the silane group may be prepared directly from the acid copolymer or by first converting the acid copolymer to an acyl halide copolymer.

The alpha-olefin/alpha-beta-ethylenically unsaturated carboxylic acid copolymers are converted to acid halide copolymers by treating with a suitable halogenating agent. Such agents include carbonyl chloride, thionyl chloride, phosphorus trichloride and phosphorus pentachloride, and the equivalent bromine and iodine compounds. The halogen substitution step is usually carried out in an organic solvent for the copolymer, preferably a halogenated solvent. The solvent should be liquid under reaction conditions, and contain between 1 and 12 carbon atoms. Suitable solvents include carbon tetrachloride, perchloroethylene, trichloroethylene, toluene, benzene, and xylene. The reaction may also be carried out in the absence of a solvent using solid polymer and thionyl chloride vapor as the halogenating agent. A more complete description of processes for producing such copolymers is contained in Ser. No. 254,567, filed Jan. 29, 1963. Preferably, substantially all of the acid groups are converted to acid halide groups.

Copolymer containing silane groups may also be obtained by hydrolyzing an alpha-olefin/vinyl ester copolymer to form an alpha-olefin/vinyl alcohol copolymer. This is a known process and is described in the literature. See, for example, U.S. Patent 2,386,347, issued to Roland. The vinyl alcohol copolymer is then reacted with an epoxy silane and forms an ether linkage between the carbon atom of the copolymer chain and the Q radical.

The conversion of the copolymers containing alpha-olefin units and alpha-beta-ethylenically unsaturated acid, acyl halide units or vinyl alcohol units, to silane containing copolymers is preferably carried out by dissolving the polymer in a suitable solvent and adding the silane compound to the solution. Suitable solvents include hydrocarbon solvents and chlorinated hydrocarbon solvents such as benzene, toluene, xylene, hexane, cyclohexane, carbontetrachloride, tetrachloroethylene, trichloroethylene, and the like. In the case of the acyl halide copolymers the silane compound appears to react substantially stoichiometrically with the halide atoms of the copolymer. Thus, the amount of conversion of halide to the silane derivative can be regulated by merely regulating the amount of silane compound added. The conversion is usually carried out at a temperature between 25 and 200° C.; the temperature is not critical.

In general, it is desirable to have a sufficient number of silane radicals present in the copolymer to cross-link the copolymer and form a network. A network could be accomplished with as few as two silane radicals per copolymer molecule. Stated in terms of mol percent, the number of silane radicals necessary to form a network is about 0.1 percent based on the copolymer. The silane radicals can be present in amounts of up to 25 mol percent based on the mols of comonomer units in the original copolymer. Preferably, the mol percent silane is about 1–10 percent.

The silanes employed to react with the copolymers have the formula: Y—Q—T—Z, where Y is selected from the class consisting of radicals having the formula

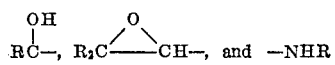

Q is a divalent radical having 1 to 22 carbon atoms that is bonded through a carbon atom to both T and Y. Q is preferably a divalent hydrocarbon radical such as an aromatic, aliphatic, cyclic, or heterocyclic radical. Q may be substituted with one or more groups selected from the class consisting of esters, ethers, tertiary amines, amides, ketones, aldehydes, nitriles, and halides. Q may also be substituted with one or more siloxane radicals having the formula

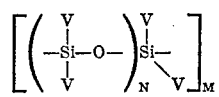

where N is 1 to 28 and M is 1, provided the siloxane radical is bonded to the remainder of the Q radical through carbon atoms, T is a silicon containing radical selected from the class consisting of

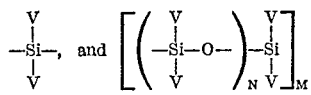

where N is 1 to 28 and M is 1. Z is a hydrolyzable radical preferably selected from the class consisting of —OR, —Cl, —Br, —OOCCH$_3$

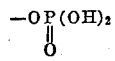

phenyl and substituted phenyl groups, —NR, and —SR. The R in Y and Z is a radical selected from the class consisting of hydrogen and hydrocarbon containing radicals containing 1 to 22 carbon atoms. Thus, R may be aromatic, aliphatic, cyclic, or heterocyclic, and may be substituted with one or more groups selected from the class consisting of esters, ethers, tertiary amines, amides, ketone, aldehydes, nitriles, halides and silicon containing radicals; V is selected from the class consisting of R and Z.

Not all silanes of the formula Y—Q—T—Z will react with all of the copolymers disclosed. Y must be —OH or —NHR to react with the acyl halide copolymer. Y must be an epoxide group to react with a vinyl alcohol copolymer. Y may be —OH, —NHR or an epoxide group when the copolymer is an acid copolymer.

Examples of suitable epoxy radicals are:

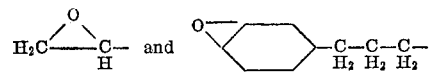

A simple silane molecule useful in the reaction with the acid halide group is

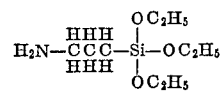

in other words, the case where Y is —NH$_2$, where Q is propyl,

and V is the same as Z and Z is ethoxy. It can thus be seen that the only critical features in the silane molecule are that it contains an alcoholic radical, an amine radical, or an epoxy radical, a radical on a silicon atom that is hydrolyzable, and that the alcoholic radical or amine radical and the group containing the silicon atom having the hydrolyzable radical be bonded through a carbon atom to a divalent radical having 1 to 22 carbon atoms. The other variants that may be present in the radicals of the silane molecule are not critical.

The reaction between the acid halide containing copolymer and the silane molecule is illustrated by means of the following chemical equation:

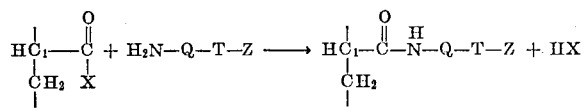

where C$_1$ is a carbon atom in the alpha-olefin/alpha-beta-ethylenically unsaturated carboxylic acid halide chain, X is halide, Q, T, Z and R are as defined above.

The silane group containing copolymers whether derived from an alpha-olefin/vinyl ester copolymer, an alpha-olefin/alpha-beta-ethylenically unsaturated carboxylic acid copolymer, or from an alpha-olefin/alpha-beta-ethylenically unsaturated carboxylic acid halide copolymer will all contain the radical

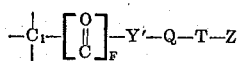

and more specifically, when derived from alpha olefin/ alpha-beta-ethylenically unsaturated carboxylic acid copolymer or acid halide, will have the formula

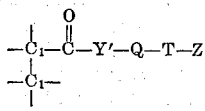

where $C_1$ is a carbon atom in the main copolymer chain, F is zero or 1, Y' is selected from the class consisting of —O— and

when F is zero, Y' must be —O—, Q is a divalent radical having 1 to 22 carbon atoms that is bonded through carbon atoms to both Y' and T, T is a silicon containing radical selected from the class consisting of

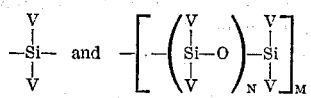

where N is 1 to 28 and M is 1, Z is a hydrolyzable group, preferably —OR, —Cl, —Br, —OOCCH$_3$,

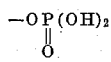

phenyl or substituted phenyl groups, —NR and —SR, R is a radical selected from the class consisting of hydrogen and hydrocarbon containing radicals having 1 to 22 carbon atoms, and V is selected from the class consisting of R and Z.

It will be noted that the Z radical of the formula set forth above for the silane compound is a radical that is readily hydrolyzable. The Z radical is a very important portion of the copolymer molecule, for by the addition of moisture to the copolymer, the Z radicals hydrolyze and then condense to form Si—O—Si crosslinks, thus making the copolymers intractable and improving the cut-through resistance, abrasion resistance, and the like. The hydrolyzable character of the Z radical can also be used to form coatings on various substrates, especially metal substrates and glass substrates. In the case of silica glass substrates, the copolymers are linked directly to the silica atoms of the substrate through

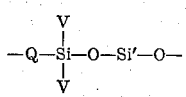

linkage, where Si' is a silicon atom of the glass surface. A significant advantage of the copolymers of this invention is that the crosslinking is readily controlled and does not occur under fabrication conditions until the composition is contacted with water.

Another significant feature of the copolymers of the present invention is that they rapidly hydrolyze and condense to form crosslinked products; the hydrolysis and condensation is accelerated in compositions which contain acid by-product. The presence of the acid speeds up further hydrolysis and further condensations.

The copolymers of this invention are particularly useful in the formation of fibers, films, and coating on paper, wood, metal, glass, and other polymers.

The copolymers of this invention which contain unreacted acid halide groups can be reacted with hydroxyl group, carboxylic acid group, or NH group-containing substrates, resulting in coatings that are chemically bonded to the substrate and crosslinked, or with other monomer units to further modify the polymer properties.

In the following examples which illustrate the invention, all parts and percentages are in parts by weight unless otherwise specified, and all solvents are substantially free from water unless otherwise specified.

Example 1

Ethylene-methacrylic acid copolymer, whose composition was 78.4 weight percent ethylene units and 11.4 weight percent methacrylic acid units, was completely converted to the acid chloride derivative using phosphorus pentachloride. An infrared scan of a film pressed from the ethylene-methacrylyl chloride polymer had a peak at 5.6 microns due to the acid chloride carbonyl and no peaks at 3.0, 6.1 and 6.6 microns.

Two grams of this ethylene-methacrylyl chloride polymer were dissolved in 100 cc. of carbon tetrachloride with heating and stirring at 60° C. When the polymer was completely in solution, 5.3 cc. of a solution of gamma-aminopropyl-triethoxy-silane (made from 1 cc. of gamma-aminopropyl-triethoxy-silane and 9 cc. of carbon tetrachloride) were added to react with the polymer. A film of the purified product was examined under infrared which confirmed the product to be ethylene methacrylomidopropyltriethoxysilane. The spectrum showed amide peaks at 3.0, 6.1 and 6.6 microns.

Example 2

Fifteen grams of an ethylene-methacrylyl bromide polymer, which had been made from an ethylene-methacrylic acid copolymer of 82.6 weight percent ethylene units and 17.4 weight percent methacrylic acid units, were dissolved with heating and stirring in 100 cc. of carbon tetrachloride at about 60° C. 6 cc. of gamma-aminopropyltriethoxysilane were added to react with the polymer solution.

Glass microscope slides were flamed to clean their surfaces and then dipped in the product solution to give them a coating of the product. When heated in an air oven at 300° C. for 15 minutes, a slide showed some scorching, but an equivalent sample coated with polyethylene charred under the same treatment. This illustrates the improved heat stability of this material over polyethylene.

A length of copper wire was coated with the product by pulling it through the solution. This gave a tough, resilient, solvent resistant coating.

Example 3

Ethylene-methacrylyl chloride polymer, made from ethylene-methacrylic acid copolymer whose composition was 88.4 weight percent ethylene units and 11.6 weight percent methacrylic acid units, was used as the starting point. An infrared scan of a film of this resin shows a peak due to the acid chloride carbonyl at 5.6 microns but no peaks at 3.0, 6.1 or 6.6 microns.

Two grams of this polymer were dissolved in 100 cc. of carbon tetrachloride with heating and stirring. 4.7 cc. of a solution of 1 cc. of delta-aminobutylmethyldiethoxysilane in 9 cc. of carbon tetrachloride were added to react with the polymer solution. An infrared scan of a film cast from the product solution showed that reaction had taken place. This was evident from a decrease in the size of the acid chloride carbonyl peak and the appearance of peaks at 3.0, 6.1 and 6.6 microns due to the amide formed.

Example 4

Ethylene-acrylic acid copolymer of about 6 weight percent acrylic acid was converted to the acid chloride derivative. An infrared scan of a film of this material showed a peak at 5.6 microns caused by the acid chloride carbonyl; no peaks appeared at 3.0, 6.1 or 6.6 microns.

One gram of the ethylene-acrylyl chloride polymer was dissolved in 200 cc. of tetrachloroethylene with heating and stirring. 1.5 cc. of a solution of gamma-aminopropyltriethoxysilane, made from 1 cc. of gamma-aminopropyltriethoxysilane and 9 cc. of tetrachloroethylene, were added to the polymer solution to react with it. An infrared scan of a film cast from the product showed that reaction had taken place as the 5.6 micron peak of the acid chloride carbonyl had decreased in size while amide peaks appeared at 3.0, 6.1 and 6.6 microns.

When glass microscope slides with an uncontaminated surface were dipped in the product solution, it was then possible to melt bond polyethylene to the primed surface. 180° peel strengths of these bonded coatings went as high as 20 lb./in.

Example 5

Ten grams of ethylene-fumaric acid copolymer of about 3.6 weight percent fumaric acid were dissolved in 300 cc. of tetrachloroethylene at 70° C. 1.75 grams of phosphorus pentachloride were added to the solution which was kept stirred and heated at 70° C. for over four hours. The polymer product was precipitated from the solution with the addition of dry acetone. The precipitate was then filtered, washed with acetone and dried in a vacuum oven under a nitrogen bleed at room temperature. An infrared scan of a film pressed from the product showed it to be the acid chloride derivative of the original polymer as shown by the acid chloride carbonyl peak at 5.6 microns while there were no peaks at 3.0, 6.1 or 6.6 microns.

One gram of this acid chloride polymer was dissolved in 100 cc. of carbon tetrachloride with heating and stirring. 1.1 cc. of a solution made from 1 cc. of gamma-aminopropyltriethoxysilane in 9 cc. of carbon tetrachloride was added to the acid chloride polymer solution to react with it. An infrared scan of a film cast from this solution showed that reaction had taken place, as evidenced by a reduction in the size of the acid carbonyl peak at 5.6 microns and by the presence of amide peaks at 3.0, 6.1 and 6.6 microns.

When a series of clean glass slides with uncontaminated surfaces where primed with this final product solution they were found to be capable of adhering to polyethylene when it was melted on them.

Example 6

Twelve grams of styrene-methacrylic acid copolymer, whose composition was 90 weight percent styrene units and 10 weight percent methacrylic acid units, were placed in 350 cc. of tetrachloroethylene with 10 grams of phosphorus pentachloride. The mixture was heated and stirred to give a product solution after four and a half hours. The product was precipitated with dry methanol to give a gummy precipitate which hardened gradually. An infrared scan of a film of this product showed that reaction had taken place as could be seen from a strong absorption at 5.6 microns due to the acid chloride carbonyl.

Two grams of the acid chloride polymer were dissolved in 100 cc. of carbon tetrachloride with heat and stirring in less than half an hour. Five cc. of a solution made from 1 cc. of gamma-aminopropyltriethoxysilane and 9 cc. of carbon tetrachloride were added to react with the acid chloride polymer solution. An infrared scan cast from the final product solution showed that reaction had taken place as could be seen by the decrease in absorption at the acid carbonyl peak at 5.6 microns and by the appearance of amide peaks at 3.0, 6.1 and 6.6 microns.

When an uncontaminated glass slide was primed with the final product solution, it was capable of adhesion to polystyrene when the polymer was melted on to the slide. When a cast film of this material was exposed to atmospheric moisture for a period it was not able to be formed with heat due to a degree of crosslinking which developed.

Example 7

Ten grams of a copolymer made by grafting methacrylic acid on to polypropylene were placed in 300 cc. of tetrachloroethylene with 20 grams of phosphorus pentachloride and reacted with heating and stirring for over thirteen hours to give a product in solution. The product was precipitated by the addition of dry acetone, filtered, washed with dry acetone and dried under vacuum at room temperature. An infrared scan of a film pressed from the product showed that reaction had taken place to give the acid chloride derivative. This was shown by an acid chloride carbonyl peak which appeared at 5.6 microns.

Two grams of the acid chloride polymer were dissolved in 100 cc. of carbon tetrachloride with heating and stirring just below the solvent reflux temperature in less than two hours. 2.3 cc. of a solution made from 1 cc. of gamma-aminopropyltriethoxysilane and 9 cc. of carbon tetrachloride were added to react with the acid chloride polymer solution. An infrared scan of a film cast from the final product solution showed reaction had taken place by the appearance of amide absorption bands at 3.0, 6.0 and 6.65 microns.

A cast film of the final product which had been exposed for a time to atmospheric moisture showed its intractability, caused by crosslinking which had taken place, when it showed little flow when heated at 200° C. and pressed at 40,000 lbs. for two minutes. A similarly exposed piece of cast film of the final product showed this crosslinking when it was found to be no longer completely soluble, despite a 7 hour extraction in a jacketed soxhlet with refluxing carbon tetrachloride.

Example 8

Ten grams of an ethylene-itaconic acid copolymer containing about 6 weight percent itaconic acid units were dissolved in 350 cc. of tetrachloriethylene with heating and stirring in approximately half an hour. Ten grams of phosphorus pentachloride were then added to react with the polymer in solution. After four hours, the reaction product was precipitated with dry acetone, filtered, washed with dry acetone and dried under vacuum at room temperature. An infrared scan of a film pressed from this product showed that reaction had taken place as was evidenced by an acid chloride carbonyl peak at 5.6 microns. There were no peaks at 3.0, 6.1 or 6.6 microns.

Two grams of the acid chloride polymer were dissolved with heating and stirring in 100 cc. of carbon tetrachloride. 2.8 cc. of a solution made from 1 cc. of gamma-aminopropyltriethoxysilane and 9 cc. of carbon tetrachloride were added to react with the acid chloride polymer solution. An infrared scan of a cast film of this final product showed reaction had taken place by the decrease in the acid chloride carbonyl peak at 5.6 microns and by the appearance of amide peaks at 3.0, 6.1 and 6.6 microns.

When a cast film of this final product had been exposed to the atmosphere, it crosslinked and showed little flow when pressed at 40,000 lbs. for 2 minutes at 200° C. between 8 inch square platens. Seven hours extraction of a similarly exposed film of the final product with refluxing carbon tetrachloride in a jacketed soxhlet, showed the material to be 94 weight percent insoluble as a result of the crosslinking despite the fact that prior to crosslinking the material was completely soluble.

Example 9

Ten grams of ethylene-maleic acid copolymer containing approximately 3 weight percent maleic acid units were dissolved in 350 cc. of tetrachloroethylene with heating and stirring in less than half an hour. Eight grams of phosphorus pentachloride were then added to react with the solution which was kept heated and stirred. After five hours, the product was precipitated from solution by the addition of dry acetone, filtered and washed with dry acetone. The precipitated polymer product was dried under vacuum at room temperature. An infrared scan of a film pressed from the product showed that reaction had taken place to produce the acid chloride polymer as evidenced by the appearance of an acid chloride carbonyl absorption peak at 5.6 microns. There were no peaks at 6.1 or 6.6 microns.

Two grams of the acid chloride polymer were dissolved in 100 cc. of carbon tetrachloride with heating and stirring. Three cc. of a solution made from 1 cc. of gamma-aminopropyltriethoxysilane in 9 cc. of carbon tetrachloride were added to react with the acid chloride polymer solution. An infrared scan of a film cast from the final product solution showed reaction had taken place by the appearance of amide peaks at 6.1 and 6.6 microns.

A cast film of the final product, after exposure to atmospheric moisture, became intractable and showed very little flow due to crosslinking when pressed at 150° C. between two 8 inch square platens for 2 minutes at 40,000 lbs. A similarly exposed cast film of the final product showed 88 weight percent insolubility in refluxing carbon tetrachloride after 7 hours in a jacketed soxhlet, showing it had crosslinked since it was originally completely soluble.

Example 10

Ten grams of a polymer made by grafting 4 grams methacrylic acid on to 20 grams linear polyethylene were heated and stirred in 350 cc. of tetrachloroethylene for 1½ hours. Twenty grams of phosphorus pentachloride were then added to the mixture and allowed to react with heating and stirring for five hours. The product which was in solution was precipitated by the addition of dry acetone, filtered, washed with dry acetone and then vacuum dried at room temperature. An infrared scan run on a film pressed from the product showed by the appearance of an acid chloride carbonyl peak at 5.6 microns that reaction had taken place to give the acid chloride polymer.

Two grams of the acid chloride polymer were dissolved in 100 cc. of carbon tetrachloride with heating and stirring. 8.2 cc. of a solution made from 1 cc. of gamma-aminopropyltriethoxysilane in 9 cc. of carbon tetrachloride were added to react with the acid chloride polymer solution. An infrared scan of a cast film of the final product showed that reaction had taken place as shown by the appearance of amide absorption peaks at 6.05 and 6.6 microns.

A cast film of the final product after it had been exposed to atmospheric moisture showed it had crosslinked by having little flow when pressed at 150° C. between two 8 inch square platens for two minutes at 40,000 lbs. A similarly exposed piece of cast film had a 51 weight percent insolubility when extracted with refluxing carbon tetrachloride for 7 hours in a jacketed soxhlet. It was completely soluble before it was crosslinked.

Example 11

Three grams of ethylene-vinyl acetate-methacrylyl chloride polymer which had been made from ethylene-vinyl acetate-methacrylic acid terpolymer whose composition was 22.9 weight percent vinyl acetate units, 7.7 weight percent methacrylic units and the remainder ethylene units were dissolved in 200 cc. of carbon tetrachloride with heating and stirring. 5.5 cc. of a solution made from 1 cc. of gamma-aminopropyltriethoxysilane in 9 cc. of carbon tetrachloride were added to react with the acid chloride polymer. An infrared scan of a film cast from the product solution showed reaction had taken place as could be seen by the appearance of amide peaks at 3.0, 6.05 and 6.55 microns.

Example 12

Twelve grams of ethylene-ethyl acrylate-acrylic acid terpolymer, whose approximate composition was 84 weight percent ethylene units, 10 weight percent ethyl acrylate units and 6 weight percent acrylic acid units, were dissolved in 350 cc. of tetrachloroethylene with heating and stirring. 7.5 grams of phosphorus pentachloride were added to react with the polymer solution. After three hours, the product was precipitated by adding dry acetone, filtered, washed with dry acetone and then dried under vacuum at room temperature. An infrared scan run on a film pressed from the product showed that reaction had taken place as was shown by an acid chloride carbonyl peak at 5.6 microns. No peaks were evident at 3.0, 6.1 and 6.6 microns.

Two grams of the acid chloride polymer were dissolved with heating and stirring in 100 cc. of carbon tetrachloride in less than half an hour. 2.9 cc. of a solution made from 1 cc. of gamma-aminopropyltriethoxysilane in 9 cc. of carbon tetrachloride were added to react with the acid chloride polymer solution. An infrared scan of a film cast from the final polymer product solution had amide peaks at 3.0, 6.1 and 6.6 microns showing that reaction had taken place.

A cast film of this final polymer product, after having been exposed to atmospheric moisture, showed its crosslinking by not being amenable to pressing at 180° C. between 8 inch platens at 40,000 lbs. for two minutes. A similarly exposed piece of cast film became 96 weight percent insoluble in refluxing carbon tetrachloride in a jacketed soxhlet over a 7 hour period showing the crosslinking, since it had been originally completely soluble.

Example 13

Ten grams of ethylene-neohexane-methacrylic acid terpolymer wihch contained approximately 6.9 weight percent, methacrylic acid units were dissolved with heating and stirring in 350 cc. of tetrachloroethylene in about half an hour. Seven grams of phosphorus pentachloride were added and allowed to react with the polymer solution while continuing to heat and stir the mixture. After four and a half hours the product was precipitated from solution by adding dry acetone, filtered, washed with dry acetone and then dried under vacuum at room temperature. An infrared scan of a film pressed from the product had an acid chloride carbonyl peak at 5.6 microns which showed that reaction had taken place.

Two grams of the acid chloride polymer were dissolved in 100 cc. of carbon tetrachloride with heating and stirring. 3.2 cc. of a solution made from 1 cc. of gamma-aminopropyltriethoxysilane in 9 cc. of carbon tetrachloride were added to react with the acid chloride polymer solution. An infrared scan of a film cast from the final product solution had amide peaks at 3.0, 6.15 and 6.65 microns showing that reaction had taken place.

A film cast from the final product solution, after it had been exposed to atmospheric moisture, showed almost no flow due to crosslinking when pressed at 200° C. between two 8 inch square platens at 40,000 lbs. for two minutes. Another cast film of the final product after similar exposure, showed 96 weight percent insolubility after 7 hours extraction in refluxing carbon tetrachloride in a jacketed soxhlet. This showed the crosslinking which had taken place since the polymer product was originally completely soluble.

Example 14

Fifteen grams of ethylene-vinyl acetate-methyl hydrogen maleate terpolymer, whose composition was approximately 53 weight percent ethylene units, 46 weight percent vinyl acetate units and 1 weight percent methyl hydrogen maleate units, were dissolved with heating and stirring in 350 cc. of tetrachloroethylene in twenty minutes. Five grams of phosphorus pentachloride were added to react with the polymer solution while the heating and stirring were continued. After 5 hours, the product was precipitated with dry methanol, filtered, washed with dry methanol and then dried under vacuum at room temperature.

Two grams of the acid chloride polymer product were dissolved in 100 cc. of carbon tetrachloride with heating and stirring. 0.5 cc. of a solution made from 1 cc. of gamma-aminopropyltriethoxysilane and 9 cc. of carbon tetrachloride was added to react with the acid chloride polymer solution.

A film cast from the final polymer product solution, after being exposed to atmospheric moisture, showed little flow when pressed at 150° C. between two 8 inch platens at 40,000 lbs. for two minutes, thus showing the crosslinking which had taken place. Another similar film of the product was 6 weight percent insoluble in refluxing carbon tetrachloride for 7 hours in a jacketed soxhlet showing crosslinking had taken place. The polymer product was originally completely soluble.

Example 15

Two grams of ethylene-methylacrylyl fluoride polymer, which had been made from an ethylene-methacrylic acid copolymer containing 17.4 weight percent of methacrylic acid units, was dissolved in 200 cc. of carbon tetrachloride with heating and stirring. When the polymer was in solution, 1.4 grams of gamma-aminopropyltriphenoxysilane were added to react with the polymer.

An infrared scan of the product showed reaction had taken place as evidenced by the amide absorption peaks.

Example 16

Two grams of ethylene-methacrylyl chloride polymer, which had been made from ethylene-methacrylic acid copolymer which contained 11.6 weight percent methacrylic acid units, was dissolved in 200 cc. of tetrachloroethylene with heating and stirring. When the polymer was in solution, 0.687 grams of p-aminophenyltriethoxysilane were added to react with the polymer in solution.

When glass was primed with this product, it bonded well to polyethylene which was melted on to it.

Example 17

Two grams of ethylene-methacrylyl chloride polymer, which had been made from ethylene-methacrylic acid copolymer which contained 11.6 weight percent methacrylic acid units, was dissolved in 200 cc. of tetrachloroethylene with heating and stirring. When the polymer was in solution, 0.72 grams of phenylaminomethyl-(methyl)-diisopropoxysilane was added to react and thus to give the product in solution.

Example 18

Two grams of ethylene-methacrylyl chloride polymer, which had been made from ethylene-methacrylic acid copolymer which contained 18 weight percent methacrylic acid units, were dissolved in 100 cc. of carbon tetrachloride with heating and stirring at 60° C. When the polymer was in solution, 1.34 grams of di-(4-hydroxymethylphenyl)-diethoxysilane, a yellow viscous oil, were added to react with the polymer in solution. When cast from solution, the product formed a crosslinked material.

Example 19

Two grams of ethylene-methacrylyl chloride polymer, made from an ethylene-methacrylic acid copolymer containing 5.0 weight percent methacrylic acid units, were dissolved in 200 cc. of carbon tetrachloride with heating and stirring. The polymer in solution was reacted with 0.49 gram of di-(4-hydroxymethylphenyl)-diphenoxysilane which was mixed in with it. When the solvent was evaporated, a highly crosslinked material could be developed with time.

Example 20

Two grams of ethylene-methacrylyl chloride copolymer, made from ethylene-methacrylic acid copolymer containing 17.4 weight percent methacrylic acid units, were dissolved in 200 cc. of carbon tetrachloride with heating and stirring at 60° C. When the polymer was in solution, 1.15 grams of 2-hydroxyphenylmethylideneaminopropylmethyldiethoxysilane, a dark yellow-brown liquid were added to react with the polymer to give the final product.

Example 21

Two grams of ethylene-methacrylyl chloride copolymer made from ethylene-methacrylic copolymer containing 17.4 weight percent methacrylic acid units, were dissolved in 100 cc. of toluene with heating and stirring at 60° C. When the polymer was in solution, 1.23 grams of methyl - N-[(2-methyl-5-thienyl)methyl]aminopropylmethyldiethoxysilane were added to react with the polymer to give the final product.

Example 22

Two grams of ethylene-methacrylyl chloride polymer, made from ethylene-methacrylic acid copolymer containing 17.4 weight percent methacrylic acid units, were dissolved in 200 cc. of toluene with heating and stirring. When the polymer was in solution, 1.36 grams of gamma-(N - 2-carbethoxyethyl)-aminopropyltriethoxysilane were added slowly to react with the polymer in the hot solution to give the final product in the solution.

Example 23

Two grams of ethylene-methacrylyl chloride polymer, made from ethylene-methacrylic acid copolymer containing 17.4 weight percent methacrylic acid units, were dissolved in 200 cc. of carbon tetrachloride with heating and stirring. When the polymer was in solution, 1.0 gram of delta-(N-2-cyanoethyl)aminobutylmethyldiethoxysilane was added slowly to react with the polymer in solution, thus giving the desired product.

Example 24

Two grams of ethylene-methacrylyl chloride polymer, made from ethylene-methacrylic acid copolymer containing 17.4 weight percent methacrylic acid units, were dissolved in 200 cc. of perchloroethylene with heating and stirring. When the polymer was in solution, 1.91 grams of gamma-aminopropylheptaethoxytrisiloxane were added slowly to the stirred solution which was at approximately 100° C. to give the final product.

Example 25

Three grams of ethylene-methacrylyl chloride polymer, made from ethylene-methacrylic acid copolymer containing 5.0 weight percent methacrylic acid units, were dissolved in 200 cc. of perchloroethylene with heating and stirring near the boiling point of the solvent. When the polymer was in solution, 0.79 gram of 2-hydroxyphenylmethylideneaminopropylpentaethoxydisiloxane was added slowly to react with the polymer in solution to give the product.

Example 26

Three grams of ethylene-methacrylyl chloride polymer, made from ethylene-methacrylic acid copolymer which contained 5.0 weight percent methacrylic acid units, were dissolved in 200 cc. of perchloroethylene with stirring at a temperature just below the boiling point of the solvent. When the polymer was in solution, 0.855 gram of 2,4-dihydroxybenzophenone-4-sulfonamidopropyltriethoxysilane was added to the solution to react with the polymer and give the final product.

Example 27

Two grams of ethylene methacrylyl chloride polymer, made from ethylene methacrylic acid copolymer containing 17.4 weight percent methacrylic acid units were dissolved in tetrachloroethylene with heating and stirring. When the polymer was in solution, 0.25 gram of hydroxyethylmethacrylate was added to react with a portion of the acyl chloride groups. When the reaction had taken place, 0.46 cc. of gamma-aminopropyltriethoxysilane were added to the remaining acyl chloride groups.

Infrared scans of films cast from the solution prior to adding the gamma-aminopropyltriethoxysilane showed that reaction had taken place by the decrease in the acyl chloride carbonyl peak in the 5.6$\mu$ region and the appearance of ester absorption. Infrared scans taken from films cast after the gamma-aminopropyltriethoxysilane showed that reaction had taken place by the appearance of amide peaks at 3.0, 6.1 and 6.6$\mu$.

Example 28

Nineteen grams of ethylene methacrylyl chloride polymer, made from ethylene methacrylic acid copolymer containing 17.4 weight percent methacrylic acid units were dissolved in tetrachloroethylene with heating and stirring. When the polymer was in solution, 1.6 cc. of methacrylic acid were added to react with a portion of the acyl chloride groups. When the reaction had taken place, 4.4 cc. of gamma-aminopropyltriethoxysilane were added to remaining acyl chloride groups.

Infrared scans of films cast from the solution prior to adding the gamma-aminopropyltriethoxysilane showed that reaction had taken place by the appearance of an anhydride peak at 5.75 μ. Infrared scans taken from films cast after the gamma-aminopropyltriethoxysilane showed that reaction had taken place by the appearance of amide peaks at 3.0, 6.1 and 6.6 μ.

Example 29

Two grams of ethylene-methacrylyl chloride polymer, made from ethylene-methacrylic acid copolymer which contained 17.4 weight percent methacrylic acid units, were dissolved in 200 cc. of toluene with heating and stirring. When the polymer was in solution, 1.66 grams of bis(triethoxysilylpropyl)amine were added to react with the polymer and give the desired product.

In Examples 1 to 29 the melt index (M.I.) of the polymers prior to halogenation was as follows: Examples 1, 3, 16, and 17, M.I. 4.9; Examples 2, 15, 18, 20–24, and 27–29, M.I. 42.5; Example 4, M.I. 15; Example 5, M.I. 200; Example 6 was not measured; Example 7, the polypropylene had a M.I. of 1; Examples 8 and 9, M.I. 100; Example 10, the polyethylene had a M.I. of 2; Example 11, M.I. 27.2; Example 12, M.I. 40; Example 13, M.I. 1110; Example 14, M.I. 105; Examples 19, 25 and 26, M.I. 580.

The process of any one of Examples 1 to 29 may be repeated with substantially the same results using silane compounds having the following formulas:

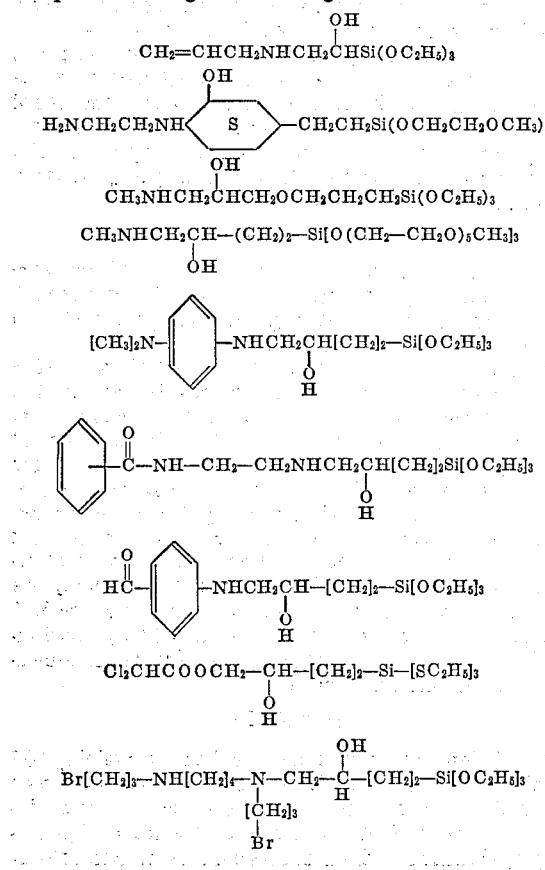

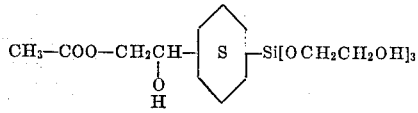
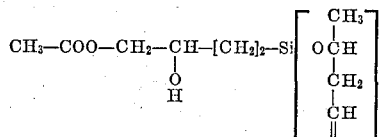
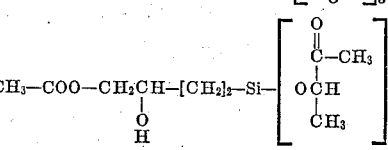
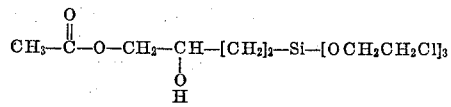
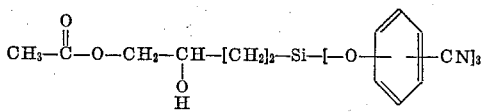
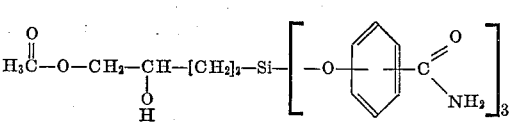
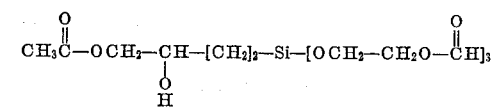
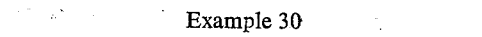

Example 30

Eighteen grams of an ethylene-methacrylyl chloride polymer containing 12 weight percent methacrylyl chloride groups were dissolved in 600 cc. of tetrachloroethylene. The solution was heated to over 100° C. and then 4.86 cc. of gamma aminopropyltriethoxysilane were added to react with it. The solution was then heated to reflux temperature and then reflexed for more than two hours with a dry nitrogen purge bubbling through it. The solution then had 15 cc. of ethanol added to it and was reheated to reflux for a further 2 hours with dry nitrogen bubbling through it as a purge. The condenser was then removed and volatiles were distilled off from the solution. Make-up quantities of tetrachloroethylene were added to the solution as necessary. An infrared spectrum of a cast film of the polymer product showed that the silane had reacted with, and was bonded to the polymer molecule through an amide linkage as was shown by amide absorptions in the 2.95, 6.1, and 6.6 micron regions. The presence of alkoxy (ethoxy) groups on the silicon atoms was shown by absorptions in the 8.6, 9.1, 9.3 and 10.45 micron regions. The polymer was found to form a tough adherent coating on mild steel when applied in a solution.

Example 31

Eighteen grams of an ethylene-methacrylyl chloride polymer containing 12 weight percent methacrylyl chloride units were dissolved in 600 cc. of tetrachloroethylene. The solution was heated to over 100° C. and then 4.86 cc. of gamma aminopropyltriethoxysilane were added to react with it. The solution was then heated to reflux temperature and refluxed for more than 2 hours with a dry nitrogen purge bubbling through it. The solution was cooled to 52° C. and then 4.62 cc. of acetyl chloride were added to it and the solution reheated and refluxed for another 1½ hours with a dry nitrogen purge. The solution was cooled overnight and a further 4.62 cc. of acetyl chloride were added at 23° C. The solution was heated and refluxed for several hours. The condenser was then removed and volatiles were distilled off. Make-up tetrachloroethylene was added as required. An infrared scan of a cast film of the product film showed reaction had taken place. Amide absorptions in the regions 2.95, 6.1, and 6.6 microns show the silane has reacted with the polymer. The alkoxy absorptions have disappeared due to the replacement of alkoxy groups by chlorines on the silicons to produce absorptions in the 14.3 micron region. Glass primed with a solution of this polymer offered good adhesion to polyethylene melted on to it.

Example 32

The product polymer described in Example 30 was taken in a solution of 600 cc. of tetrachloroethylene, which contained 18 grams of polymer, and was cooled to room temperature before 4.81 cc. of acetyl bromide was added to react with it. The solution was then heated up to reflux temperature and refluxed with a dry nitrogen purge bubbling through it for several hours. The solution was cooled to room temperature and a further 4.81 cc. of acetyl bromide were added before the procedure was repeated. One further addition of acetyl bromide was effected in the same way. The condenser was then removed and volatiles were distilled off with make-up tetrachloroethylene being added as necessary. The final polymer product solution was yellow in color. A cast film of the polymer product was examined by infrared and this showed that reaction had been accomplished as the alkoxy absorption had been removed and Si-halogen absorptions appeared in the 14.5 micron region. The polymer solution was found effective for priming glass for the subsequent adhesion of polyethylene.

Example 33

The polymer product described in Example 31 was taken in a solution in 600 cc. of tetrachloroethylene, which contained 18 grams of polymer, and was cooled before 3.55 cc. of glacial acetic acid were added to it to react with it. The solution was heated up to reflux with a dry-nitrogen purge bubbling through it. After 3 hours of refluxing the condenser was removed and volatiles were distilled off for 1½ hours while make-up tetrachloroethylene was added to the solution as required. The procedure was repeated with another 3.55 cc. of glacial acetic acid. An infrared spectrum of a cast film of the polymer product showed the removal of the silicon-halogen absorption in the 14.3 micron region and the introduction of absorptions in the 8.6, 10.5, and 12.7 micron regions showing that reaction had taken place. The polymer product was found to hydrolyze and crosslink rapidly when exposed in the atmosphere after having been coated on a surface.

Example 34

The polymer product described in Example 31 was taken in a solution in 600 cc. of tetrachloroethylene, which contained 18 grams of polymer, and had 7.75 grams of potassium dihydrogen phosphate added to it in 50 cc. of ether. The solution was heated and refluxed for an hour before being cooled down again. Another 100 cc. of ether were added and the solution was then refluxed again for several hours. During the course of the reaction some polymer gelled out of solution and an insoluble white precipitate formed in the solution. An infrared spectrum of a film of the polymer product showed that reaction had taken place as shown by absorptions in the 3.7 micron region, due to hydroxyls on the phosphorus, and in the 8.7 micron region due to P=O. The polymer formed a good adherent coating when applied on glass.

Example 35

The polymer product described in Example 31 was taken in a solution in 600 cc. of tetrachloroethylene, which contained 18 grams of polymer, and was mixed with 20.7 cc. of a 3M solution of phenylmagnesiumbromide in ether together with 40 cc. of dioxane. The solution was heated and refluxed for 2 hours during which time a considerable quantity white precipitate formed. An infrared spectrum of a cast film of the polymer product showed that reaction had taken place as shown by Si-phenyl absorptions in the regions 7.15 and 8.9 microns and mono-substituted benzene absorptions in the regions 14.3 and 13.6 microns. The polymer product formed a good adherent coating when applied on glass.

Example 36

The polymer product described in Example 31 was taken in a solution in 600 cc. of tetrachloroethylene, which contained 18 grams of polymer, and was mixed with 5.1 cc. of n-propylamine to react with it. The solution was refluxed with a dry nitrogen purge through it for 2 hours. At first the whole solution appeared to gel but with time, the gel broke down. The condenser was then removed and volatiles were distilled off for 1½ hours with make-up tetrachloroethylene being added as required. The procedure was repeated with a further 5.1 cc. of n-propylamine. An infrared scan of a cast film showed reaction had taken place. The polymer product was capable of crosslinking readily when exposed to the atmosphere after being coated on a glass sheet.

Example 37

The polymer product described in Example 31 was taken in a solution in 600 cc. of tetrachloroethylene, which contained 18 grams of polymer, and was mixed with 5 cc. of ethylmercaptan to react with it. The solution was refluxed for an hour with a dry nitrogen purge bubbling through it. The solution was then cooled, and a further 5 cc. of ethylmercaptan were added to it before it was refluxed again. This procedure was repeated and 30 cc. of ethylmercaptan were added in all while the purge was changed from dry nitrogen to hydrogen sulphide. The condenser was then removed and volatiles were distilled off while make-up tetrachloroethylene was added as necessary. An infrared scan of a cast film of the product polymer showed reaction was accomplished. The polymer product gave an adherent coating to glass when applied to it from a solution.

Example 38

A 700 gram sample of an 80% hydrolyzed ethylene-vinyl actate polymer which had originally contained 8 weight percent vinyl acetate groups was processed in a Banbury mixer and the mechanical working allowed to bring the polymer temperature up to 100° C. A solution of 110.3 cc. of glycidoxypropyltrimethoxysilane in 110 cc. of benzene was then added to the melt a small amount at a time with mixing between each addition. When all the reagents had been mixed, the polymer was mixed for 25 minutes during which time the temperature rose constantly due to the mechanical working. The polymer prodduct was then removed and a film of it was pressed and examined for its infrared spectrum, which confirmed reaction had taken place. The ether linkage bonding the silane to the polymer was shown by absorption in the 8.85 micron region. The polymer product could be pressed initially, but if allowed to cure by exposure to the atmosphere, it becames crosslinked.

Example 39

An ethylene-methacrylic acid copolymer containing 10.3 weight percent methacrylic acid units and having a melt index of 11 was fed into a mixer-extruder at a rate of 8 pounds an hour. A 60 volume percent solution of glycidoxypropyltrimethoxysilane in an inert solvent, tetrachloroethylene, was injected into the melt in the extruder at a rate equivalent to 14 cc. of silane per minute. The melt temperature was maintained at about 180° C. and as the extruded polymer came out the die, it was picked up on chill rolls which were enclosed in a dry nitrogen atmosphere. The solid polymer was then cut into pieces for ease of handling. An infrared scan run on a pressed film of the product showed that the silane had reacted with the polymer as was evident by a decrease of the carbonyl peak in the 5.9 micron region and the appearance of an ester peak in the 5.8 micron region.

Example 40

An ethylene-methacrylic acid copolymer containing 10.3 weight percent methacrylic acid units and having a melt index of 11, was fed into an extruder at a rate of 6 pounds per hour. A 60 volume percent solution of 3,4 epoxycyclohexylethyltrimethoxysilane in tetrachloroethylene was injected into the melt in the extruder at a rate equivalent to 16 cc. per minute of silane. The extruded polymer was collected in a dry nitrogen atmosphere. Infrared scans run on a pressed film of the product show that reaction has taken place bonding the silane to the polymer as shown by the appearance of an ester peak in the 5.75 micron region. A sheet of aluminum was coated by melt pressing the polymer product on it, thus providing a tough, clear, adherent coating.

Example 41

A 1000 gram sample of ethylene-vinyl acetate-methacrylic acid terpolymer which contained 16.8 weight percent vinyl acetate units and 6.8 weight percent methacrylic acid units was milled in a Banbury mixer until the mechanical working had raised the temperature of the polymer to 100° C. A solution of 188.8 cc. of 3,4 epoxycyclohexylethyltrimethoxysilane in 150 cc. of benzene was added a little at a time to the polymer and mixed in well between additions. The reagents were then mixed together for 8 minutes until the melt temperature had risen to 110° C. A film was pressed from the polymer product and its infrared scan showed reaction had taken place to bond the silane to the polymer as shown by a decrease in the carboxylic acid carbonyl band in the 5.9 micron region and an increase in the ester band in the 5.75 micron region. When pressed into sheets, the product polymer gave a clear material which could be cured.

What is claimed is:

1. A copolymer containing polymerized alpha-olefin units having the formula

where A is selected from the class consisting of hydrogen and the methyl radical, said alpha-olefin units being present in said copolymer to the extent of at least 50 mol percent, at least 0.1 mol percent polymerized units containing the radical having the formula

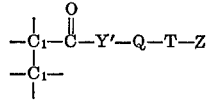

where $C_1$ is a carbon atom in the main polymer chain, Y' is a radical selected from the class consisting of —O— and

Q is a divalent radical having 1 to 22 carbon atoms that is bonded through carbon atoms to both Y' and T, T is a silicon containing radical selected from the class consisting of

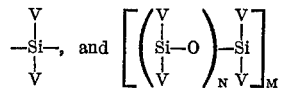

where N is 1 to 28 and M is 1; Z is a hydrolyzable group; R is a radical selected from the class consisting of hydrogen and hydrocarbon containing radicals containing 1 to 22 carbon atoms; and V is selected from the class consisting of R and Z, and polymerized units having the formula

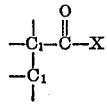

where $C_1$ is a carbon atom in the main polymer chain and X is halogen.

2. The composition of claim 1 containing from 0.1 to 25 mol percent polymerized vinyl ester units.

3. The composition of claim 1 which has been reacted through the

radical with a member of the class consisting of hydroxyl containing radicals, carboxylic acid containing radicals, and amine containing radicals.

References Cited

UNITED STATES PATENTS

| 2,399,653 | 5/1946 | Roland | 260—87.3 |
| 2,434,179 | 1/1948 | Sharkey | 260—87.3 |
| 2,646,425 | 7/1953 | Barry | 260—94.9 |
| 3,027,357 | 3/1962 | Stickle | 260—78.5 |
| 3,252,825 | 5/1966 | Marzocchi et al. | 117—126 |

FOREIGN PATENTS

| 1,315,316 | 12/1962 | France. |
| 834,326 | 5/1960 | Great Britain. |
| 949,126 | 2/1964 | Great Britain. |

GEORGE F. LESMES, *Primary Examiner.*

S. H. BLECH, *Assistant Examiner.*